(12) United States Patent
Lo et al.

(10) Patent No.: US 11,186,191 B2
(45) Date of Patent: Nov. 30, 2021

(54) CHARGING DEVICE FOR ELECTRIC VEHICLE

(71) Applicant: Delta Electronics, Inc., Taoyuan (TW)

(72) Inventors: Tzu-Hao Lo, Taoyuan (TW); Ming-Whang Wang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 169 days.

(21) Appl. No.: 16/703,750

(22) Filed: Dec. 4, 2019

(65) Prior Publication Data

US 2020/0180449 A1 Jun. 11, 2020

Related U.S. Application Data

(60) Provisional application No. 62/776,728, filed on Dec. 7, 2018.

(30) Foreign Application Priority Data

Oct. 14, 2019 (CN) .......................... 201910975015.2

(51) Int. Cl.
  *B60L 53/16* (2019.01)
  *H02J 7/00* (2006.01)
  (Continued)

(52) U.S. Cl.
  CPC ............... *B60L 53/16* (2019.02); *B60L 53/31* (2019.02); *H02J 7/007192* (2020.01); *H02J 7/243* (2020.01)

(58) Field of Classification Search
  CPC .... B60L 53/16; B60L 53/31; H02J 7/007192; H02J 7/243
  (Continued)

(56) References Cited

U.S. PATENT DOCUMENTS 9,170,585 B2 * 10/2015 Flick .................. G05D 23/1905
D835,589 S * 12/2018 Zhang .......................... D13/171
(Continued)

FOREIGN PATENT DOCUMENTS

CN 101609971 B 9/2012
CN 103402812 B 2/2017
(Continued)

*Primary Examiner* — Suresh Memula
(74) *Attorney, Agent, or Firm* — Kirton McConkie; Evan R. Witt

(57) ABSTRACT

A charging device for charging an electric vehicle includes a power plug, a charging gun, a control box, a temperature detecting circuit and an over-temperature protection circuit. The charging gun is detachably connected with the electric vehicle and includes a connection confirmation terminal and a connection confirmation circuit. The connection confirmation circuit outputs a connection confirmation signal to the connection confirmation terminal. The temperature detecting circuit detects the temperature of the power plug or the control box and outputs a temperature signal to a second control unit of the control box when the temperature of the power plug or the control box exceeds a threshold temperature level. The over-temperature protection circuit is electrically connected between the second control unit and the connection confirmation terminal. The second control unit controls the over-temperature protection circuit to adjust the voltage level of the connection confirmation terminal according to the temperature signal.

10 Claims, 3 Drawing Sheets

(51) Int. Cl.
*H02J 7/24* (2006.01)
*B60L 53/31* (2019.01)

(58) Field of Classification Search
USPC .......................................................... 320/154
See application file for complete search history.

(56) References Cited

U.S. PATENT DOCUMENTS

| 10,227,014 | B2* | 3/2019 | Wu .......................... B60L 53/16 |
| 11,001,162 | B2* | 5/2021 | Yamada .................. B60K 6/485 |
| 11,046,186 | B1* | 6/2021 | Appelbaum ........... H02J 7/0013 |
| 2015/0006008 | A1* | 1/2015 | Wei .......................... B60L 3/003 701/22 |
| 2016/0137079 | A1* | 5/2016 | Jefferies .................. B60L 53/18 320/109 |
| 2016/0138980 | A1* | 5/2016 | Jefferies ................. G01K 13/00 374/141 |
| 2016/0368390 | A1* | 12/2016 | Yang ........................ B60L 1/003 |
| 2018/0013180 | A1* | 1/2018 | Dyer ................... H01M 10/613 |
| 2018/0208067 | A1* | 7/2018 | Zhou ................... B60L 11/1818 |
| 2018/0229615 | A1* | 8/2018 | Shumaker ........... H01R 13/7137 |
| 2019/0199040 | A1* | 6/2019 | Tanizaki .................. H01R 13/502 |
| 2019/0344678 | A1* | 11/2019 | Alford .................... B60L 53/30 |
| 2020/0047622 | A1* | 2/2020 | Asr .......................... B60L 1/00 |

FOREIGN PATENT DOCUMENTS

| TW | M482903 U | 7/2014 | |
| TW | M552709 U | 12/2017 | |
| WO | WO-2016154281 A1 * | 9/2016 | ........... G08B 21/182 |

* cited by examiner

CHARGING DEVICE FOR ELECTRIC VEHICLE

CROSS-REFERENCE TO RELATED APPLICATION

This application claims the benefit of U.S. Provisional Application No. 62/776,728 filed on Dec. 7, 2018, and entitled "CHARGING DEVICE FOR ELECTRIC VEHICLE", the entirety of which is hereby incorporated by reference. This application also claims the priority to China Patent Application No. 201910975015.2 filed on Oct. 14, 2019, and entitled "CHARGING DEVICE FOR ELECTRIC VEHICLE", the entirety of which is hereby incorporated by reference.

FIELD OF THE INVENTION

The present disclosure relates to a charge device for an electric vehicle, and more particularly to a charge device with over-temperature protecting function and applied to an electric vehicle.

BACKGROUND OF THE INVENTION

In recent times, as environmental awareness rises, developing electric vehicles powered by electricity to replace traditional automobiles powered by fossil-based fuels has gradually becoming an important target of automobile industry.

In addition, in order to facilitate providing required electric power to charge the electric vehicle, an electric vehicle charging equipment using a commercial AC power source and applied to home or workplace is developed and promoted. Take a household charging device for example. When the battery of the electric vehicle needs to be charged by a power outlet of the commercial power source, the electric vehicle must be connected with the commercial AC power source through the charging device. The charging device comprises a power plug electrically connected with the power outlet of the commercial AC power source and a charging gun electrically connected with a vehicle-side socket of the electric vehicle. During the process of charging the battery of the electric vehicle, the power plug of the charging device is plugged into the power outlet of the commercial AC power source in home.

However, in order to shorten the time period of charging the electric vehicle, the electric vehicle has to receive the large charging current through the charging device. If the charging device provides the large charging current to the electric vehicle for a long time, the temperature of the charging device is gradually increased. In addition, if the connection between the power socket and the commercial AC power source is improper, a great deal of heat is generated and leakage current is generated. Because of the above issues, the temperature of the charging device is very high or even the charging device is damaged or burnt out.

Therefore, there is a need of providing a charge device with an over-temperature protecting function and applied to an electric vehicle in order to address the drawbacks of the conventional technologies.

SUMMARY OF THE INVENTION

An object of the present invention provides a charging device with an over-temperature protecting function and applied to an electric vehicle. If the temperature of a power plug or a control box of the charging device exceeds a threshold temperature level, the charging device notifies the electric vehicle to perform a protection procedure. While the protection procedure is performed, the magnitude of charging current is decreased. Since the temperature is decreased, the possibility of causing the damage of the element or circuit will be minimized. In addition, the signal transmission of the over-temperature protecting function will not influent the detection and the determination of the charging information of the electric vehicle, and there is no need to add extra wiring. Optionally, the charging device and the electric vehicle are in wireless communication with each other, and thus the operating reliability is enhanced.

In accordance with an aspect of the present invention, there is provided a charging device for charging an electric vehicle. The electric vehicle comprises a first control unit. The charging device comprises a power plug, a charging gun, a control box, a temperature detecting circuit and an over-temperature protection circuit. The power plug receives an AC power from an AC power source. The charging gun is connected with the power plug through a charging cable, and is detachably connected with the electric vehicle. The charging gun comprises a connection confirmation terminal and a connection confirmation circuit. The connection confirmation circuit is configured to output a connection confirmation signal to the connection confirmation terminal. When a connection between the charging gun and the electric vehicle is in a normal status, the connection confirmation signal has a first voltage level. When a connection between the charging gun and the electric vehicle are in an abnormal status, the connection confirmation signal has a second voltage level. The control box is connected between the power plug and the charging gun, and is configured to selectively transmit the AC power from the power plug to the charging gun. The control box comprises a second control unit. The temperature detecting circuit is electrically connected with the second control unit, and is configured to detect a temperature of the power plug or a temperature of the control box. If the temperature of the power plug or the temperature of the control box exceeds a threshold temperature level, the temperature detecting circuit outputs a corresponding temperature signal. The over-temperature protection circuit is connected between the second control unit and the connection confirmation terminal. The second control unit controls the over-temperature protection circuit to adjust a voltage level of the connection confirmation terminal according to the corresponding temperature signal.

In accordance with an aspect of the present invention, there is provided a charging device for charging an electric vehicle. The electric vehicle comprises a first control unit and a first wireless transmission module. The first control unit and the first wireless transmission module is connected with each other. The charging device comprises a power plug, a charging gun, a control box, a temperature detecting circuit and an over-temperature protection circuit. The power plug receives an AC power from an AC power source. The charging gun is connected with the power plug through a charging cable and is detachably connected with the electric vehicle. The control box is connected between the power plug and the charging gun, and is configured to selectively transmit the AC power from the power plug to the charging gun. The control box comprises a second control unit. The temperature detecting circuit is electrically connected with the second control unit and is configured to detect a temperature of the power plug or a temperature of the control box. If the temperature of the power plug or the temperature of the control box exceeds a threshold temperature level, the temperature detecting circuit outputs a corresponding temperature signal. The over-temperature protection circuit is electrically connected to the second control unit and comprises a second wireless transmission module. When the corresponding temperature signal is received by the second control unit, the second control unit controls the second wireless transmission module of the over-temperature protection circuit to output a wireless signal to the first wireless transmission module of the electric vehicle. When the wireless signal is received by the first control unit of the electric vehicle through the first wireless transmission module, the first control unit of the electric vehicle performs a protection procedure.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first", "second", and etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
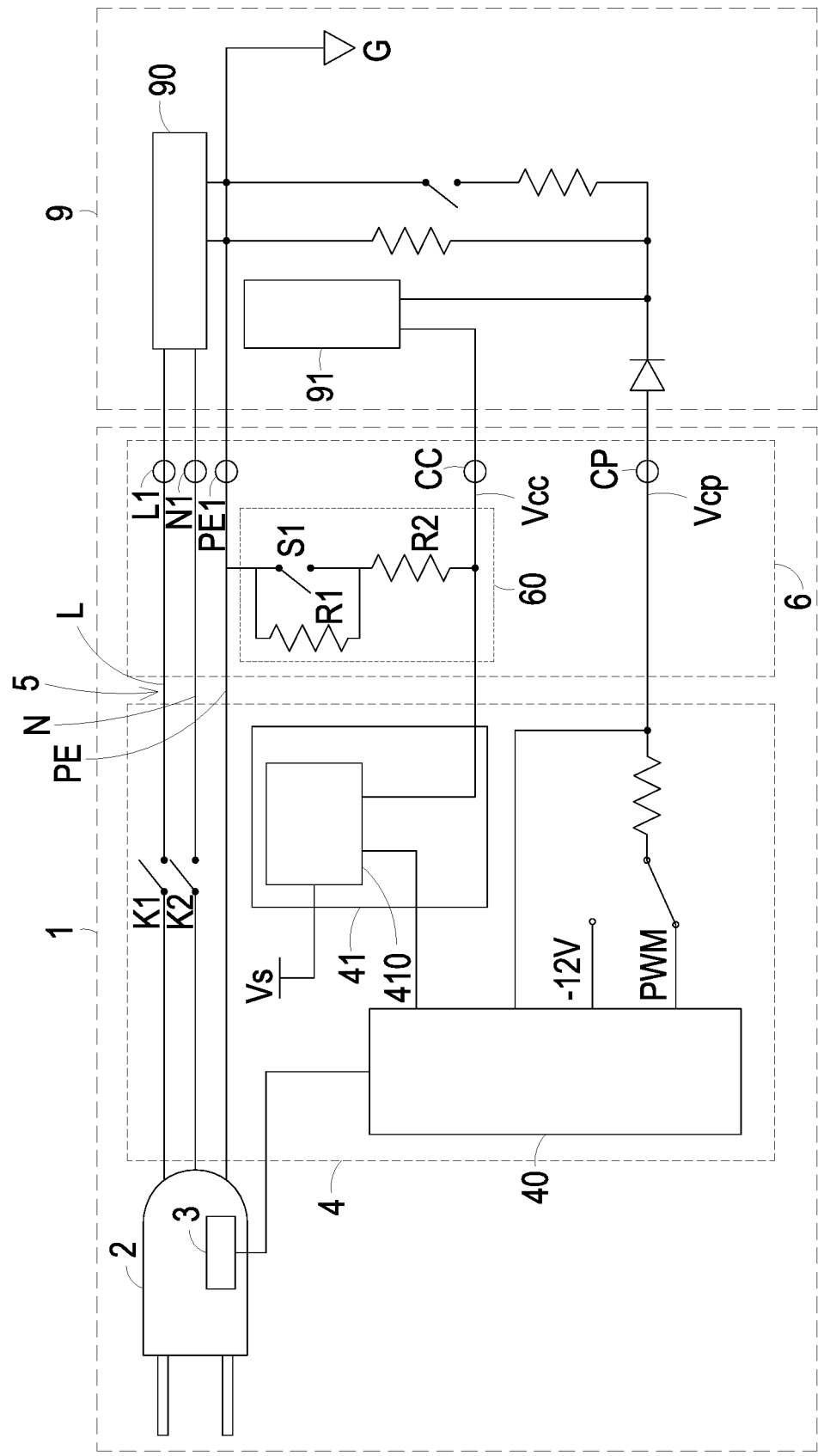
FIG. 1 is a schematic circuit diagram illustrating a charging device for an electric vehicle according to a first embodiment of the present disclosure.
Figure 2:
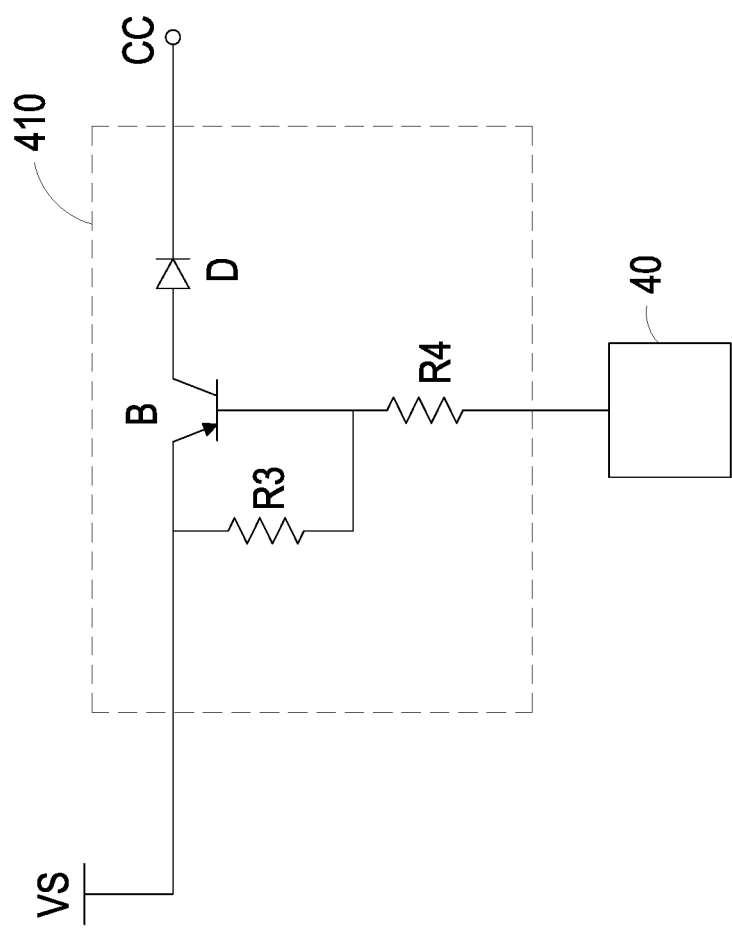
FIG. 2 is a schematic circuit diagram illustrating an over-temperature protection circuit of the charging device as shown in FIG. 1.

FIG. 1 is a schematic circuit diagram illustrating a charging device for an electric vehicle according to a first embodiment of the present disclosure. FIG. 2 is a schematic circuit diagram illustrating an over-temperature protection circuit of the charging device as shown in FIG. 1. As shown in FIGS. 1 and 2, the charging device 1 meets the standard specifications in European regulations, US regulations or/and international regulations. The charging device 1 is detachably connected between a power outlet of a household commercial AC power source (not shown in FIGS. 1 and 2) and an electric vehicle 9. The electric vehicle 9 comprises an on-board charging unit 90 and a first control unit 91. The on-board charging unit 90 comprises for example but not limited to a battery and a charger, which is configured to charge the battery. The first control unit 91 is configured to control the charging operation of the electric vehicle 9. The charging device 1 is configured to receive the AC power from the power outlet of the commercial AC power source and charge the electric vehicle 9. The charging device 1 comprises a power plug 2, a control box 4, a charging cable 5 and a charging gun 6. The power plug 2 is detachably connected with the power outlet of the commercial AC power source to receive the AC power from the commercial AC power source. The control box 4 is connected between the power plug 2 and the charging cable 5 and configured to selectively transmit the AC power received by the power plug 2 to the charging cable 5. The control box 4 issues a notification signal about the supply capability of the charging device 1 to the first control unit 91. According to the notification signal, the maximum allowable input current of the on-board charging unit 90 is controlled. Moreover, the control box 4 comprises a second control unit 40 configured to control the operation of the control box 4. The second control unit 40 of the control box 4 and the first control unit 91 of the electric vehicle 9 are in signal communication with each other through the charging cable 5 and the charging gun 6.

In this embodiment, the charging cable 5 is connected between the control box 4 and the charging gun 6, and comprises a live wire L, a neutral wire N and a protective earth wire PE. The first terminals of the live wire L, the neutral wire N and the protective earth wire PE are connected with the power plug 2 through the control box 4, the second terminals of the live wire L, the neutral wire N and the protective earth wire PE are connected with the charging gun 6.

In an embodiment, the charging gun 6 is connected to the power plug 2 through the control box 4 and the charging cable 5. The AC power from the commercial AC power source is transmitted to the electric vehicle 9 through the power plug 2, the control box 4, the charging cable 5 and the charging gun 6. When the charging gun 6 is connected with the electric vehicle 9, the electric vehicle 9 is charged by the charging gun 6. The charging gun 6 comprises a plurality of terminals corresponding to a charging inlet (not shown in FIG. 1) of the electric vehicle 9. The charging gun 6 and the electric vehicle 9 are electrically coupled to each other through the terminals of the charging unit 6 and the charging inlet of the electric vehicle 9. For example, in the embodiment shown of FIG. 1, the plurality of terminals of the charging gun 6 comprises charging terminals L1, N1, a ground terminal PE1, a control pilot terminal CP and a connection confirmation terminal CC (according to SAE J1772 of North American standard, the connection confirmation terminal CC also can be called a proximity pilot (PP)).

When the charging gun 6 is connected with the electric vehicle 9, the charging terminals L1 and N1 are electrically coupled to the on-board charging unit 90 of the electric vehicle 9 through the corresponding terminals at the charging inlet of the electric vehicle 9, thereby charging the electric vehicle 9. Moreover, the ground terminal PE1 is electrically coupled to a first ground (not shown in FIG. 1) of the charging device 1 and/or a second ground G of the electric vehicle 9.

The connection confirmation terminal CC of the charging gun 6 is electrically coupled to the electric vehicle 9. When the charging gun 6 is properly connected with the charging inlet of the electric vehicle 9, the first control unit 91 of the electric vehicle 9 detects that the connection between the charging gun 6 and the electric vehicle 9 is in a normal state. When the charging gun 6 is detached from the charging inlet of the electric vehicle 9 or the charging gun 6 is improperly connected with the charging inlet of the electric vehicle 9, the first control unit 91 of the electric vehicle 9 detects that the connection between the charging gun 6 and the electric vehicle 9 is in an abnormal state. In the abnormal statue, the charging operation is interrupted or the conducting path is turned off. Consequently, the accident events are avoided.

The control pilot terminal CP is connected with the second control unit 40 of the control box 4 and the first control unit 91 of the electric vehicle 9. The control pilot terminal CP is configured to transmit a control pilot signal Vcp between the charging gun 6 and the electric vehicle 9. According to the voltage level and the duty cycle of the control pilot signal Vcp, the second control unit 40 of the control box 4 and the first control unit 91 of the electric vehicle 9 detect the charging information about the result of determining whether the charging preparation is completed, realizing the supply current of the charging device 1 and determining whether the charging operation is completed. The operating principles of the control pilot terminal CP and the control pilot signal Vcp are well known to those skilled in the art, and are not redundantly described herein.

In this embodiment, the charging gun 6 further comprises a connection confirmation circuit 60 electrically coupled between the connection confirmation terminal CC and the ground terminal PE1, and is configured to output a connection confirmation signal Vcc to the first control unit 91 of the electric vehicle 9 through the connection confirm terminal CC. According to the connection confirmation signal Vcc, the first control unit 91 of the electric vehicle 9 confirms the status of the connection between the charging gun 6 and the electric vehicle 9. In an embodiment, the connection confirmation circuit 60 comprises a plurality of resistor units and a switching unit S1, wherein the plurality of resistor units includes for example a first resistor unit R1 and a second resistor unit R2. The first resistor unit R1 and the switching unit S1 are electrically coupled with each other in parallel, and then are electrically coupled to the second resistor unit R2 in series. The switching unit S1 is a normally closed switch. That is, in the normal condition, the switching unit S1 is turned on to bypass the first resistor unit R1 so that the voltage level of the connection confirmation signal Vcc is maintained at a first voltage level. When the first control unit 91 of the electric vehicle 9 receives the connection confirmation signal Vcc with the first voltage level from the connection confirmation terminal CC, the first control unit 91 of the electric vehicle 9 performs a corresponding control process. When the charging gun 6 is detached from the charging inlet of the electric vehicle 9 or the charging gun 6 is improperly connected with the charging inlet of the electric vehicle 9, the first control unit 91 of the electric vehicle 9 detects that the connection between the charging gun 6 and the electric vehicle 9 is in the abnormal status. Meanwhile, the switching unit S1 is turned off. Consequently, the overall resistance value of the connection confirmation circuit 60 is changed, and the voltage level of the connection confirmation signal Vcc is changed to a second voltage level. For example, in response to the detachment of a fixing mechanism of the charging gun 6, the switching unit S1 is turned off. In other words, the first control unit 91 performs a protection procedure when the first control unit 91 receives the connection confirmation signal Vcc with the second voltage level. For example, while the protection procedure is performed, the first control unit 91 of the electric vehicle 9 notifies the control box 4 of stopping transmitting the AC power and/or decreasing the required current of the electric vehicle 9. Since the rated value of the AC power from the power plug 2 is decreased by the control box 4, the safety of using the charging device 1 is enhanced.

In this embodiment, the charging device 1 further comprises a temperature detecting circuit 3 and an over-temperature protection circuit 41. The over-temperature protection circuit 41 is disposed in the control box 4 or in the charging gun 6. The temperature detecting circuit 3 is disposed in the power plug 2 or the control box 4. In the example of FIG. 1, the over-temperature protection circuit 41 is disposed in the control box 4, and the temperature detecting circuit 3 is disposed in the power plug 2. The temperature detecting circuit 3 is connected with the second control unit 40. While the electric vehicle 9 is charged by the charging device 1, the temperature detecting circuit 3 detects the temperature of the power plug 2 or the temperature of the control box 4. When the temperature of the power plug 2 or the temperature of the control box 4 exceeds a threshold temperature level, the temperature detecting circuit 3 outputs a corresponding temperature signal to the second control unit 40 correspondingly.

The over-temperature protection circuit 41 is connected between the second control unit 40 of the control box 4 and the connection confirmation terminal CC, and comprises a switch circuit 410. The switch circuit 410 is connected with a voltage source Vs, the second control unit 40 and the connection confirmation terminal CC. The voltage source Vs has a third voltage level equal to or close to the second voltage level of the connection confirmation signal Vcc, and different from the first voltage level. The switch circuit 410 is controlled by the second control unit 40. According to the on/off state of the switch circuit 410, the path between the voltage source Vs and the connection confirmation terminal CC is selectively conducted or shut off. If the temperature signal is not received by the second control unit 40, the temperature detecting circuit 3 fails to detect the over-temperature condition. Meanwhile, the path between the voltage source Vs and the connection confirmation terminal CC is shut off under control of the second control unit 40. Consequently, the voltage of the voltage source Vs cannot be transmitted to the connection confirmation terminal CC. Under this circumstance, the first control unit 91 of the electric vehicle 9 detects the status of the connection between the charging gun 6 and the electric vehicle 9 according to the original settings of the connection confirmation terminal CC. However, if the temperature of the power plug 2 or the temperature of the control box 4 exceeds the threshold temperature level, the path between the voltage source Vs and the connection confirmation terminal CC is conducted under control of the second control unit 40. Consequently, a voltage level different from the first voltage level is transmitted from the voltage source Vs to the connection confirmation terminal CC. Meanwhile, the voltage level different from the first voltage level and provided by the voltage source Vs is considered as the connection confirmation signal Vcc by the first control unit 91 of the electric vehicle 9, and a protection procedure is performed. In an embodiment, the voltage level of the voltage source Vs is equal to the second voltage level of the connection confirmation signal Vcc, and the first control unit 91 detects that the connection between the charging gun 6 and the electric vehicle 9 is in the abnormal status. When the protection procedure is performed, the over-temperature protecting function is achieved. Alternatively, the voltage level of the voltage source Vs is equal to an arbitrary third voltage level to notify the first control unit 91 of the electric vehicle 9 of the abnormal status. Consequently, protection procedure is performed.

From the above descriptions, the charge device 1 comprises the temperature detecting circuit 3 and the over-temperature protection circuit 41. The voltage level different from the first voltage level and provided by the voltage source Vs is transmitted from the over-temperature protection circuit 41 to the first control unit 91 of the electric vehicle 9 through the connection confirmation terminal CC. If the temperature detecting circuit 3 detects that the temperature of the power plug 2 or the temperature of the control box 4 exceeds the threshold temperature level, the first control unit 91 performs the corresponding protection procedure. Since the components or circuits of the charging device 1 are not burnt out at the high temperature, the use safety is enhanced. Moreover, since the output voltage from the over-temperature protection circuit 41 is transmitted to the electric vehicle 9 through the connection confirmation terminal CC only, the control pilot signal Vcp of the control pilot terminal CP is not influenced by the output voltage from the over-temperature protection circuit 41. That is, the control pilot signal Vcp of the control pilot terminal CP can be properly transmitted from the charging device 1 to the first control unit 91 of the electric vehicle 9 and not interfered by the over-temperature protection circuit 41.

In some embodiments, the control box 4 further comprises a plurality of relays, for example a first relay K1 and a second relay K2. The first relay K1 is connected between the power plug 2 and the live wire L, and the second relay K2 is connected between the power plug 2 and the neutral wire N. The first relay K1 and the second relay K2 are controlled by the second control unit 40 of the control box 4. When the electric vehicle 9 is charged by the charging device 1, the first relay K1 and the second relay K2 are turned on under control of the second control unit 40 of the control box 4. However, when the first control unit 91 of the electric vehicle 9 notifies the control box 4 of stopping transmitting the AC power to the electric vehicle 9, the first relay K1 and the second relay K2 are turned off under control of the second control unit 40 of the control box 4.

In some embodiments, as shown in FIG. 2, the switch circuit 410 comprises a third resistor unit R3, a fourth resistor unit R4, a diode D and a PNP transistor B. A first terminal of the third resistor unit R3 is connected with the voltage source Vs and an emitter of the PNP transistor B, and a second terminal of the third resistor unit R3 is connected with a first terminal of the fourth resistor unit R4 and a base of the PNP transistor B. A second terminal of the fourth resistor unit R4 is connected with the second control unit 40. A collector of the PNP transistor B is connected with an anode of the diode D. A cathode of the diode D is connected with the connection confirmation terminal CC. However, the circuitry of the switch circuit 410 is not limited to the above embodiment shown in FIG. 2, it can be utilized as long as the voltage level of the connection confirmation terminal CC is adjustable. It is noted that the transistor of the switch circuit 410 is not restricted to the PNP transistor. For example, the PNP transistor may be replaced by a metal-oxide-semiconductor field-effect transistor (MOSFET) or an insulated gate bipolar transistor (IGBT).

Figure 3:
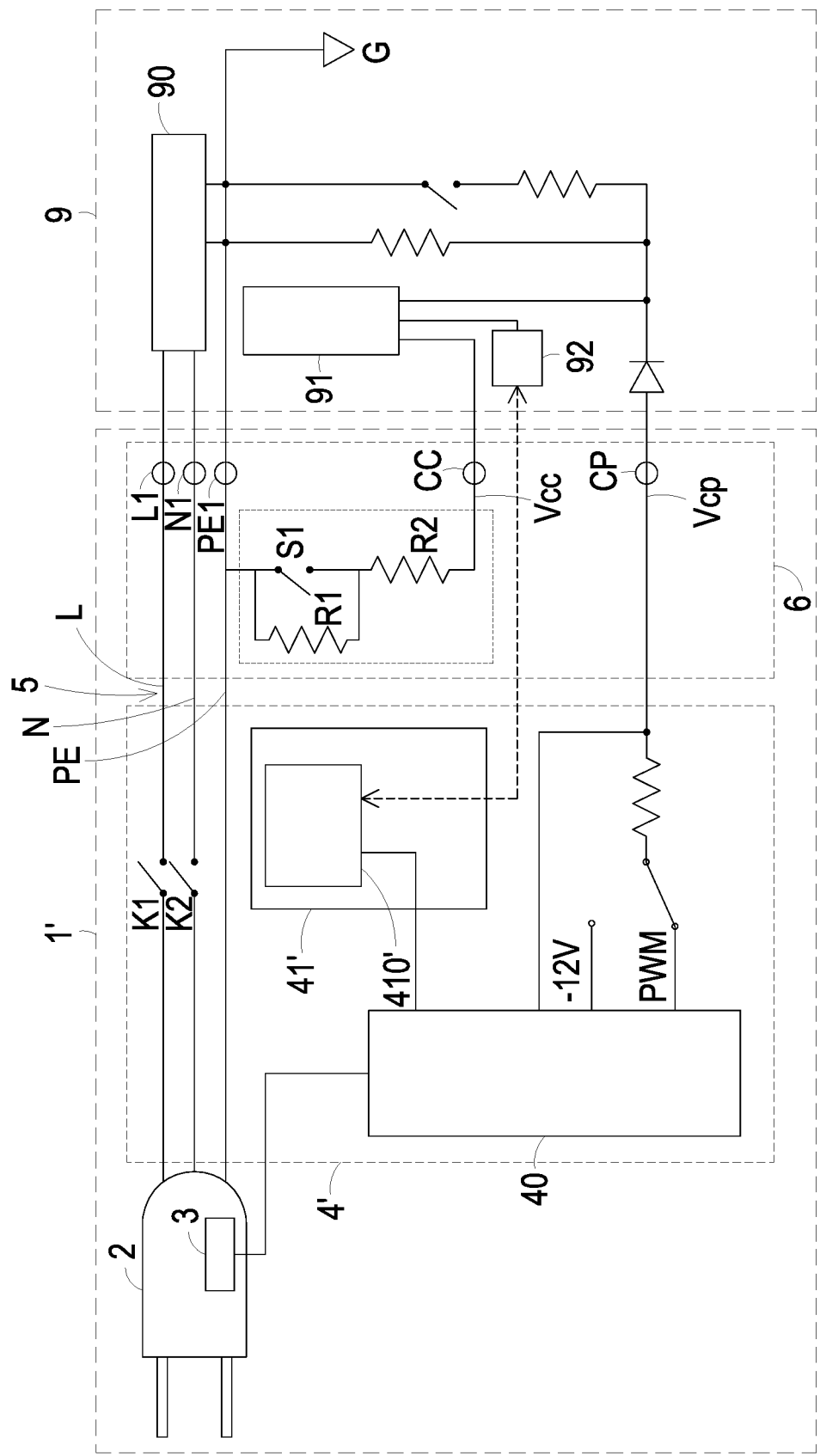
FIG. 3 is a schematic circuit diagram illustrating a charging device for an electric vehicle according to a second embodiment of the present disclosure.

FIG. 3 is a schematic circuit diagram illustrating a charging device for an electric vehicle according to a second embodiment of the present disclosure. As shown in FIG. 3, the charging device 1' is detachably connected between a power outlet of a household commercial AC power source (not shown in FIG. 3) and an electric vehicle 9. The charging device 1' comprises a power plug 2, a temperature detecting circuit 3, a control box 4', a charging cable 5 and a charging gun 6. The power plug 2, the temperature detecting circuit 3, the charging cable 5, the second control unit 40 of the control box 4' and the charging gun 6 shown in FIG. 3 are similar to the power plug 2, the temperature detecting circuit 3, the charging cable 5, the second control unit 40 of the control box 4 and the charging gun 6 of the first embodiment as shown in FIG. 1, and are not redundantly described herein. In comparison with the first embodiment shown in FIG. 1, the temperature protection circuit 41' of the control box 4' of this embodiment 3 comprises a second wireless transmission module 410'. For example, the second wireless transmission module 410' is a Bluetooth transmission module. The second wireless transmission module 410' is connected with the second control unit 40 of the control box 4'. Besides, the electric vehicle 9 further comprises a first wireless transmission module 92. For example, the first wireless transmission module 92 is a Bluetooth transmission module. The first wireless transmission module 92 is connected with the first control unit 91 of the electric vehicle 9. In this embodiment, the first wireless module 410' and the second wireless module 92 are in wireless communication with each other.

If the temperature detecting circuit 3 detects that the temperature of the power plug 2 or the temperature of the control box 4' exceeds the threshold temperature level, the temperature detecting circuit 3 outputs the corresponding temperature signal to the second control unit 40. When the temperature signal is received by the second control unit 40, the second control unit 40 controls the second wireless transmission module 410' to output a wireless signal to the first wireless transmission module 92. When the wireless signal is received by the first control unit 91 of the electric vehicle 9 through the first wireless transmission module 92, first control unit 91 performs the protection procedure. While the protection procedure is performed, the first control unit 91 of the electric vehicle 9 notifies the control box 4' of stopping transmitting the AC power and/or decreasing the required current of the electric vehicle 9. Since the rated value of the AC power from the power plug 2 is decreased by the control box 4', the safety of using the charging device 1' is enhanced.

From the above descriptions, the charge device 1' comprises the temperature detecting circuit 3 and the over-temperature protection circuit 41'. If the temperature detecting circuit 3 detects that the temperature of the power plug 2 or the temperature of the control box 4 exceeds the threshold temperature level, the second control unit 40 and the first control unit 91 are in wireless communication with each other through the second wireless module 410' and the first wireless module 92. Consequently, the protection procedure is performed. Since the components or circuits of the charging device 1' are not burnt out at the high temperature, the use safety is enhanced. Moreover, even if the charging cable 5 is pressed by the electric vehicle 9 and damaged, the over-temperature protecting function of the charge device 1' is not easy to fail since the wireless signal can be transmitted to the electric vehicle 9 through the second wireless transmission module 410' and the first wireless transmission module 92.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A charging device for charging an electric vehicle, the electric vehicle comprising a first control unit, the charging device comprising:
    a power plug receiving an AC power from an AC power source;
    a charging gun connected with the power plug through a charging cable, and detachably connected with the electric vehicle, wherein the charging gun comprises a connection confirmation terminal and a connection confirmation circuit, and the connection confirmation circuit is configured to output a connection confirmation signal to the connection confirmation terminal, wherein when a connection between the charging gun and the electric vehicle is in a normal status, the connection confirmation signal has a first voltage level, wherein when a connection between the charging gun and the electric vehicle is in an abnormal status, the connection confirmation signal has a second voltage level;
    a control box connected between the power plug and the charging gun, and configured to selectively transmit the AC power from the power plug to the charging gun, wherein the control box comprises a second control unit;
    a temperature detecting circuit electrically connected with the second control unit and configured to detect a temperature of the power plug or a temperature of the control box, wherein if the temperature of the power plug or the temperature of the control box exceeds a threshold temperature level, the temperature detecting circuit outputs a corresponding temperature signal; and
    an over-temperature protection circuit electrically connected between the second control unit and the connection confirmation terminal, wherein the second control unit controls the over-temperature protection circuit to adjust a voltage level of the connection confirmation terminal according to the corresponding temperature signal.

2. The charging device according to claim 1, wherein the over-temperature protection circuit comprises a switch circuit, the switch circuit is connected with a voltage source, the second control unit and the connection confirmation terminal, wherein the voltage source is selectively connected with the connection confirmation terminal through the switch circuit according to the corresponding temperature signal.

3. The charging device according to claim 2, wherein the switch circuit comprises a third resistor unit, a fourth resistor unit, a diode and a PNP transistor, wherein a first terminal of the third resistor is connected with the voltage source and an emitter of the PNP transistor, and a second terminal of the third resistor unit is connected with a first terminal of the fourth resistor unit and a base of the PNP transistor, a second terminal of the fourth resistor unit is connected with the second control unit, a collector of the PNP transistor is connected with an anode of the diode, and a cathode of the diode is connected with the charging gun.

4. The charging device according to claim 1, wherein the connection confirmation circuit comprises a first resistor unit, a second resistor unit and a switching unit, wherein the switching unit is electrically coupled to the first resistor unit in parallel, and the switching unit and the first resistor unit are electrically coupled to the second resistor unit in series, wherein when the switching unit is turned on, the voltage level of the connection confirmation signal is maintained at the first voltage level, and when the switching unit is turned off, the voltage level of the connection confirmation signal is maintained at the second voltage level.

5. The charging device according to claim 1, wherein when the first control unit receives the connection confirmation signal with the second voltage level through the connection confirmation terminal, the first control unit notifies the control box of stopping transmitting the AC power.

6. The charging device according to claim 1, wherein the second control unit controls the over-temperature protection circuit to adjust the voltage level of the connection confirmation terminal to be the second voltage level or a third voltage level according to the corresponding temperature signal.

7. The charging device according to claim 1, wherein the connection between the charging gun and the electric vehicle is in the abnormal status if the charging gun is improperly connected with the electric vehicle.

8. A charging device for charging an electric vehicle, the electric vehicle comprising a first control unit and a first wireless transmission module, and the first control unit and the first wireless transmission module being connected with each other, the charging device comprising:
    a power plug receiving an AC power from an AC power source;
    a charging gun connected with the power plug through a charging cable and detachably connected with the electric vehicle;
    a control box connected between the power plug and the charging gun, and configured to selectively transmit the AC power from the power plug to the charging gun, wherein the control box comprises a second control unit;
    a temperature detecting circuit electrically connected with the second control unit and configured to detect a temperature of the power plug or a temperature of the control box, wherein if the temperature of the power plug or the temperature of the control box exceeds a threshold temperature level, the temperature detecting circuit outputs a corresponding temperature signal; and
    an over-temperature protection circuit electrically connected to the second control unit and comprising a second wireless transmission module, wherein when the corresponding temperature signal is received by the second control unit, the second control unit controls the second wireless transmission module of the over-temperature protection circuit to output a wireless signal to the first wireless transmission module of the electric vehicle, wherein when the wireless signal is received by the first control unit of the electric vehicle through the first wireless transmission module, the first control unit of the electric vehicle performs a protection procedure.

9. The charging device according to claim 8, wherein while the protection procedure is performed, the first control unit of the electric vehicle notifies the control box of stopping transmitting the AC power or decreasing a required current of the electric vehicle.

10. The charging device according to claim 8, wherein both of the first wireless transmission module and the second wireless transmission module are Bluetooth transmission modules.

* * * * *